Oct. 29, 1957

H. G. RUSSER ET AL 2,811,304

OSCILLATING ELECTRIC FAN

Filed Oct. 30, 1953

Inventors:
Harold G. Russer,
William M. Copeland,
by Frank L. Neuhauser
Their Attorney.

Oct. 29, 1957  H. G. RUSSER ET AL  2,811,304
OSCILLATING ELECTRIC FAN
Filed Oct. 30, 1953  2 Sheets-Sheet 2

Inventors:
Harold G. Russer,
William M. Copeland,
by *Frank L. Neuhauser*
Their Attorney.

United States Patent Office 2,811,304
Patented Oct. 29, 1957

2,811,304

OSCILLATING ELECTRIC FAN

Harold G. Russer, Bridgeport, and William M. Copeland, Stratford, Conn., assignors to General Electric Company, a corporation of New York Application October 30, 1953, Serial No. 389,433

13 Claims. (Cl. 230—256)

The present invention relates to oscillating electric fans of the type termed usually desk fans or wall fans which comprise a pedestal upon which is mounted a unit comprising an electric motor and a fan blade assembly driven thereby, mechanism being provided whereby the unit may be oscillated back and forth on the pedestal, the mechanism comprising gearing for connection with the motor shaft which when rotated effects the oscillating movement.

The object of the invention is to provide an improved unitary construction and arrangement for controlling the motor and the connection of the gearing to the motor shaft whereby by simple adjustments the fan may be started and stopped and operated either as an oscillating fan or as a non-oscillating fan; and for a consideration of what we believe to be novel and our invention attention is directed to the following specification and to the claims appended thereto.

According to our invention, the gearing is arranged to be connected to and disconnected from the motor shaft for controlling oscillation of the fan by an actuating member which functions also as an actuator for controlling the electric switch for the fan motor. In a now preferred form of the invention the gearing comprises a worm on the motor shaft and a worm wheel for mesh therewith, and the actuating member comprises a disk which when turned moves the worm wheel by means of a cam which forms a part of the disk, into and out of engagement with the worm and at the same time moves a switch arm through the intermediary of a spring which gives a snap action to the switch arm for controlling the motor.

Figure 1:
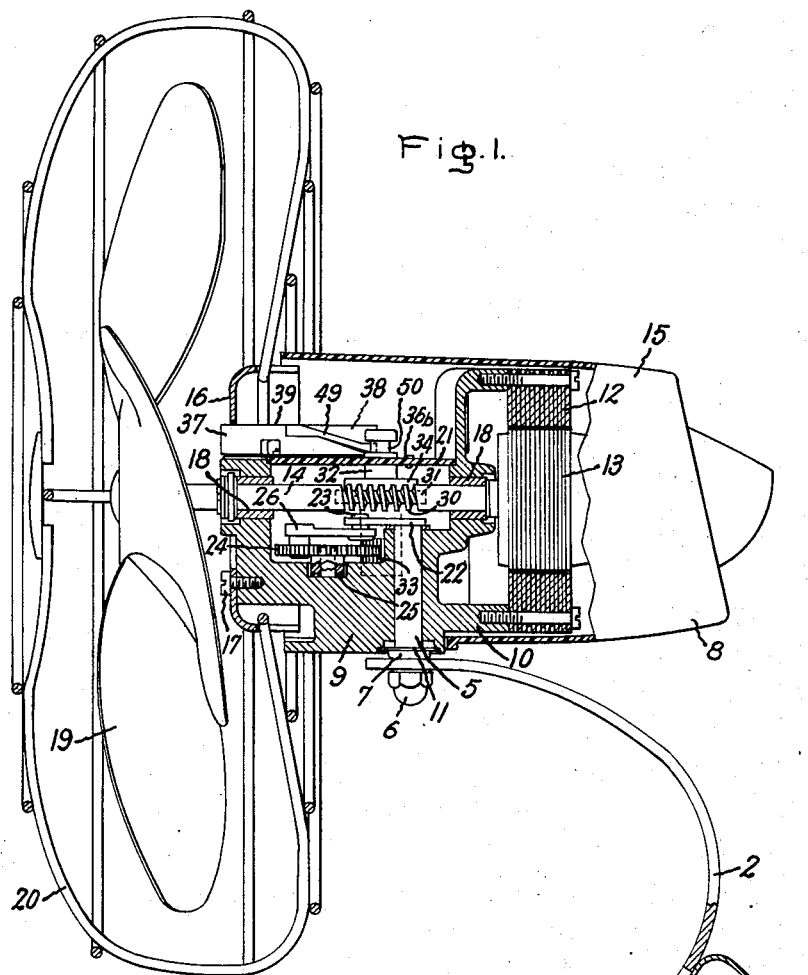
Fig. 1 is a side view, mostly in section, of an electric fan embodying the invention.

Referring to the drawing, the fan pedestal comprises a base 1 on which is mounted an arcuate shaped bracket 2, the lower arm of the bracket being adjustably mounted on the base by a bolt 3 held by a wing nut 4. Fixed on the upper arm of bracket 2 is a swivel stud 5 held by a nut 6 which serves to clamp a collar 7 on the lower end of the stud against the top surface of the bracket.

Mounted on swivel stud 5 for oscillatory movement thereon is the fan body 8 comprising a combined gear case 9 and motor frame 10. Gear case 9 has a bearing opening in which stud 5 is located. The fan body is supported on a thrust bearing washer 11 which in turn is supported on collar 7. The motor field is indicated at 12, the armature at 13, the motor shaft at 14, and the motor housing at 15. At its forward end motor housing 15 is closed by an end cap 16 fastened to the gear case by screws 17. Shaft 14 is journaled in suitable bearings 18 in the front and rear walls of the gear housing and on its outer end carries the fan blade unit 19. Suitably attached to end cap 16 is a fan guard 20. Gear case 9 has an open top closed by a cover 21. Fixed on the outer end of swivel stud 5 is an arm 22 to the outer end of which is fixed a pivot pin 23. In the bottom wall of gear case 9 is a socket in which is rotatably mounted a gear wheel 24 by means of a hub 25 on the gear wheel located in the socket. Fixed on gear wheel 24 at one side of its center is a pivot pin which is connected to pivot pin 23 by a crank arm 26. With this arrangement when gear wheel 24 is rotated an oscillatory motion will be imparted to fan body 8 due to the thrust of crank arm 26 against stationary pivot pin 23.

The structure so far described is a known one, it being similar to that disclosed in the patent to Reisch 2,600,325, patented June 10, 1952, and assigned to the same assignee as the instant application.

Our invention has to do with mechanism for connecting shaft 14 to and disconnecting it from gear wheel 24 to effect oscillatory or non-oscillatory operation of the fan, and for actuating an electric switch for the fan motor.

Figure 2:
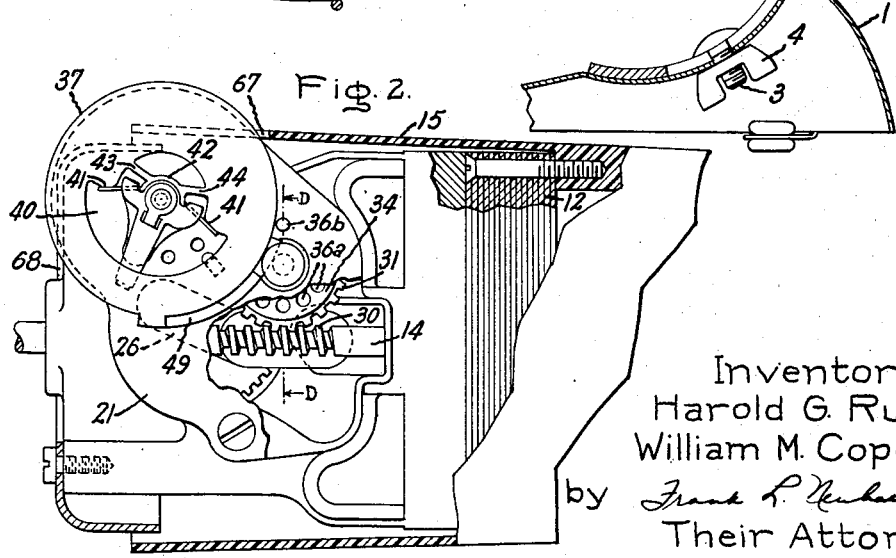
Fig. 2 is a plan view, partly in section and partly broken away, showing the switch and the gear mechanism.
Figure 7:
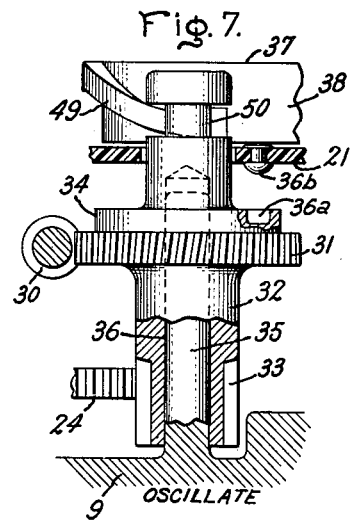
Figs. 7, 8 and 9 are detail views illustrating the operation of the worm wheel by the actuating member, the views being taken along the line D—D, Fig. 2.
Figure 8:
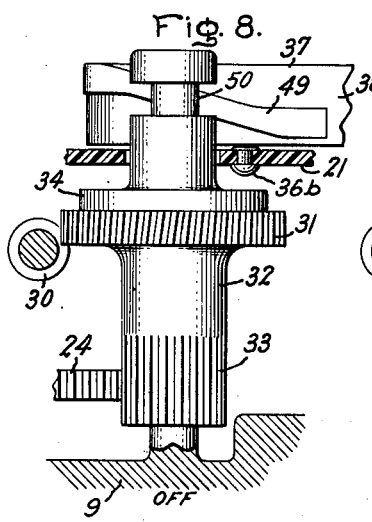
Figure 9:
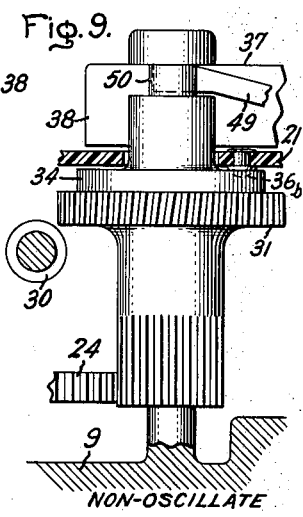

On shaft 14 is a worm 30 and adapted to mesh therewith is a worm wheel 31 on a shaft 32; and on the inner end of shaft 32 is a pinion 33 which meshes with gear wheel 24. On worm wheel 31 is a hub 34. Worm wheel 31, shaft 32, pinion 33 and hub 34 are a unitary or integral structure and such structure is adapted to be moved vertically as shown in the drawing to move worm wheel 31 into and out of engagement with worm 30. In Figs. 1, 2 and 7 the worm wheel is shown as being in mesh with worm 30. This is fan oscillating position as indicated in Fig. 7, the motor shaft when rotating effecting fan oscillation through the worm and worm wheel, pinion 33, gear wheel 24, and crank arm 26. At this time the motor switch is closed. In Fig. 8, shaft 33 is shown as having been lifted vertically to move worm wheel 31 partially from engagement with worm 30. This is "off" position, the motor switch being open at this time so that the fan is not operating. In Fig. 9 shaft 32 is shown as having been lifted vertically still further to move worm wheel 31 entirely from engagement with worm 30. This is non-oscillating position, the motor switch being at this time in closed position and worm wheel 31 being out of mesh with worm 30. As best shown in Fig. 7, shaft 32 is mounted for turning and for axial movement on a stub shaft 35 on the bottom wall of gear case 9, shaft 32 having a bore 36 in which shaft 35 is located. Pinion 33 is of a width such that it remains always in mesh with gear wheel 24 when shaft 32 is moved axially as shown in Figs. 7, 8 and 9. In hub 34 is a ring of depressions 36a in any one of which a boss 36b on the underside of gear case cover 21 fits to hold shaft 32 stationary when in the Fig. 9 position and through gear wheel 24 lock the fan body 8 in the position at which oscillation ceased.

Figure 6:
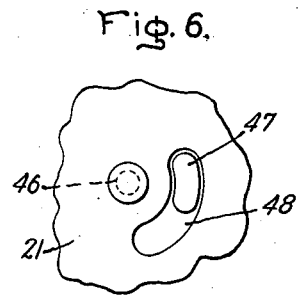
Fig. 6 is a detail view looking toward the bottom of Fig. 4.
Figure 4:
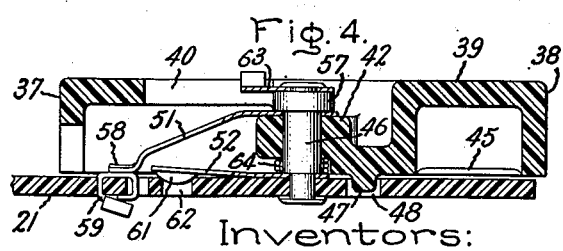
Fig. 4 is a sectional view taken on line 4—4, Fig. 3.

Shaft 32 is moved axially by an actuating member 37 in the form of a disk having a side wall 38 and a top wall 39. In top wall 39 is a generally central opening 40 shaped to provide a pair of opposed shoulders 41. At the center of the disk is a hub 42 connected to top wall 39 by webs 43 and 44 which as pointed out hereinafter form actuating abutments for a switch member. At 45 are strengthening webs. Actuating member or disk 37 is formed from a suitable insulating material. It is pivotally mounted on gear case cover 21 by a pin 46 fixed to the cover which is positioned in a bore in hub 42. Turning movement of disk 37 on pin 46 is limited by a projection 47 on the disk which moves in an arcuate opening 48 in gear case cover 21 (see Figs. 4 and 6). Axial movement of shaft 32 by a turning movement of disk 37 is effected by a cam 49 on disk side wall 38 which rides in an annular groove 50 in the outer end of the shaft. The operation of the cam will be clear from an inspection of Figs. 7, 8 and 9. The cam raises and lowers shaft 32 and worm wheel 31 positively in each direction by reason of its moving in the annular groove.

Figure 5:
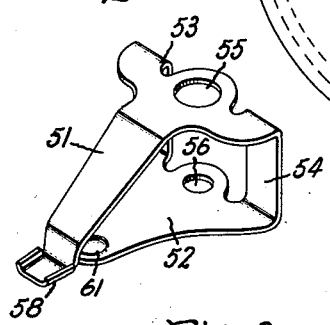
Fig. 5 is a perspective view of the movable member of the switch.

Pivotally mounted on pin 46 and arranged to be actuated by turning movement of disk 37 is a switch member comprising a switch arm 51 and a stop arm 52 joined together by two spaced apart flat posts 53 and 54, (see Fig. 5). Hub 42 is positioned in the space between posts 53 and 54. Pin 46 extends through an opening 55 in switch arm 51 and an opening 56 in stop arm 52, switch arm 51 being positioned between the top of hub 42 and a head 57 on pin 46 and the stop arm 52 being positioned between the top surface of gear case cover 21 and a shoulder on pin 46. Switch arm 51 has a contact 58 at its outer end adapted when disk 37 is in "oscillate" position (Fig. 7) to engage with a switch contact 59 (Fig. 4) fastened to gear case cover 21; when the disk is in "non-oscillate" position (Fig. 9) to engage with a switch contact 60 (Fig. 3) fastened to gear case cover 21, and when the disk is in "off" position (Fig. 8) to stand midway between contacts 59 and 60. Stop arm 52 has a bead 61 at its outer end adapted to engage with any one of three openings 62 in gear case cover 21 to index the position of the switch arm. Switch arm 51 and stop arm 52 are biased by their inherent resiliency toward gear case cover 21. Pin 46 serves as one switch terminal, it being provided with a switch terminal connector 63. In the present instance only one switch contact for "oscillate" and one switch contact for "non-oscillate" operation is shown so that the fan has only one speed of operation in each instance. However, as is obvious, several speeds of operation may be provided for by merely providing additional contacts for the switch arm suitably wired in the motor circuit, the cam being arranged so as not to move shaft 32 when the switch arm is moved into engagement with the additional contacts.

To impart snap action movement to the switch member there is provided a coil spring 64 positioned around pivot pin 46 between the underside of hub 42 and the top surface of stop arm 52, the two ends 65 and 66 of the spring being in engagement with shoulders 41 and extending across the inner surface of posts 53 and 54. Spring 64 holds disk 37 normally in the position shown best in Fig. 3 wherein web 43 and 44 which form switch actuating abutments stand in spaced relation to posts 53 and 54.

The electric wiring for the fan is not shown as its arrangement is obvious, one side of the line being connected to switch arm 51 by terminal connector 63 and the other to the motor and through it to contacts 59 and 60 in parallel.

As shown in Fig. 2, actuating disk 37 projects out through slots 67 and 68 in motor casing 15 and end cap 16 where it is accessible for turning.

Figure 3:
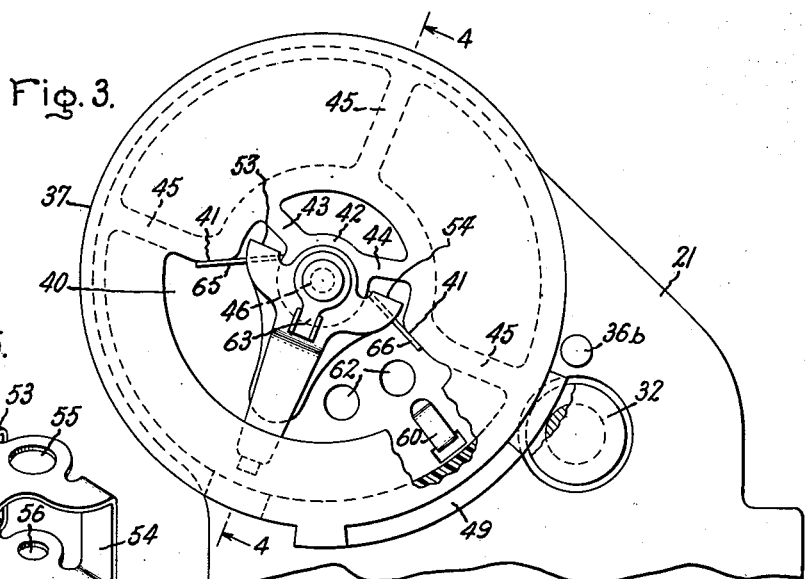
Fig. 3 is a plan view on a scale larger than that of Figs. 1 and 2, showing the switch and gear actuating member.

The operation is as follows:

In Figs. 2, 3, and 7 shaft 32 and switch arm 51 are shown positioned for oscillating fan operation, the circuit for the motor being closed through contact 59 and worm wheel 31 being in engagement with worm 30 as shown in Fig. 7. The motor now operates to rotate the fan blade unit 19 and to oscillate the fan body through pinion 33 and gear wheel 24. To stop the fan, disk 37 is turned in a counterclockwise direction as viewed in Figs. 2 and 3. As the disk turns spring end 65 is moved by the one shoulder 41 to put the spring under tension, the other end 66 of the spring being held by post 54 and the other shoulder 41 moving away from spring end 66. Thus the tension built up in the spring 64 tends to turn switch arm 51 counterclockwise but it is held from turning by stop arm 52. After a predetermined movement actuating abutment or web 43 engages post 53 and force is applied to the switch arm 51 which, coupled with that built up in spring 64, is sufficient to move bead 61 on stop arm 52 out of the one index opening 62 whereupon the spring will snap the stop arm and switch arm around until bead 61 lodges in the next or middle index opening 62. This opens the circuit to the motor. At the same time shaft 32 is lifted by cam 49 to the Fig. 8 position where worm wheel 31 is partly out of engagement with worm 30. This is neutral or off position of the fan. From this neutral position disk 37 may be moved clockwise to close the circuit through contact 59 and bring worm wheel 31 back into mesh with worm 30 or it may be moved counterclockwise another step to bring the switch arm into engagement with contact 60 and by means of the cam lift worm wheel 31 entirely out of engagement with worm 30 as shown in Fig. 9, at the same time positioning boss 36b in one of the depressions 36a to lock the fan body against oscillatory movement. In each instance the switch member is operated through the intermediary of spring 64 in the manner described in connection with the movement of the switch arm from oscillating to off position; and in each instance shaft 32 is moved positively both up and down by cam 49 riding in annular groove 50.

By our invention we provide in an oscillating electric fan simple means for simultaneously adjusting the gear drive and the control switch for either oscillating or non-oscillating operation of the fan which comprises few parts, is easy to use, reliable in operation and which can be embodied in a fan at low cost. Also, a structure wherein when in non-oscillating position the fan body is locked positively against oscillatory movement.

What we claim as new and desire to secure by Letters Patent of United States is:

1. In an oscillating electric fan, a pedestal, a fan body comprising an electric motor, means mounting the body on the pedestal for oscillatory movement with respect thereto, a worm on the motor shaft, gearing including a worm wheel positioned adjacent to said worm and being movable into and out of mesh with said worm for effecting oscillatory movement of the fan body on said mounting means, an actuating member operatively connected to said worm wheel for moving the worm wheel out of and into mesh with said worm, and switch means operatively connected to said actuating member for closing a circuit through the motor when the worm wheel is either in or out of engagement with said worm whereby the fan may be operated as either an oscillating fan or a non-oscillating fan.

2. In an oscillating electric fan, a pedestal, a fan body comprising an electric motor, means mounting the fan body on the pedestal for oscillating movement thereon, a worm on the motor shaft, gearing including a worm wheel for mesh with said worm for effecting oscillatory movement of the fan body on the pedestal, means mounting said worm wheel for axial movement with respect to said worm whereby it may be moved into and out of engagement with the worm, an actuating member for moving the worm wheel axially into and out of engagement with the worm, a switch for the electric motor, and means connecting the switch to the actuating member for moving the switch from an open position to a closed position when the actuating member moves the worm wheel either into or out of engagement with the worm whereby the fan may be operated either as an oscillating fan or a non-oscillating fan.

3. In an oscillating electric fan, a pedestal, a fan body comprising an electric motor, means mounting the fan body on the pedestal for oscillating movement thereon, a worm on the motor shaft, gearing including a worm wheel for mesh with said worm for effecting oscillatory movement of the fan body on the pedestal, means mounting said worm wheel for axial movement with respect to said worm whereby it may be moved into and out of engagement with the worm, an actuating member for moving the worm wheel axially into and out of engagement with the worm, a switch for the electric motor having an "off" position and two "on" positions, and means connecting the switch to said operating means for moving it to one of said "on" positions when the worm wheel is moved into engagement with said worm and for moving it to the other of said "on" positions when the worm wheel is moved out of engagement with said worm.

4. In an oscillating electric fan, a pedestal, a fan body comprising an electric motor, means mounting the fan body on the pedestal for oscillating movement thereon, a worm on the motor shaft, gearing including a worm wheel for mesh with said worm for effecting oscillatory movement of the fan body on the pedestal, means mounting said worm wheel for axial movement with respect to said worm whereby it may be moved into and out of engagement with the worm, a rotatable disk having a cam thereon connected with said worm wheel for moving it out of and into engagement with said worm, an electric switch for the motor, and means connecting the switch to said disk for effecting closing of the switch when the disk is rotated to either connect the worm wheel to or disconnect it from the worm.

5. In an oscillating electric fan, a pedestal, a fan body comprising an electric motor, means mounting the fan body on the pedestal for oscillating movement thereon, a worm on the motor shaft, gearing including a worm wheel for mesh with said worm for effecting oscillatory movement of the fan body on the pedestal, means mounting said worm wheel for axial movement with respect to said worm whereby it may be moved into and out of engagement with the worm, a rotatable disk having a cam thereon connected with said worm wheel for moving it out of and into engagement with said worm, an electric switch for the motor having a switch arm which has two "on" positions and an "off" position between the "on" positions, and means connecting the switch arm to said rotatable disk for moving it from "off" position to one "on" position when the disk is turned to move the worm wheel into mesh with the worm and from "off" to the other "on" position when the disk is turned to move the worm wheel out of mesh with the worm.

6. In an oscillating electric fan, a pedestal, a fan body comprising an electric motor and a gear case, means pivotally mounting the fan body on the pedestal, gearing in the gear case for effecting oscillatory movement of the fan body thereon, an actuating member on the gear case for connecting the gearing to and disconnecting it from the motor shaft, a switch for the motor mounted on the gear casing, and means connecting the switch to said actuating member for moving it from an open position to a closed position when said actuating member is moved to either connect the gearing to or disconnect it from the motor shaft.

7. The combination defined by claim 6 wherein means is provided on the gear case with which the gearing engages to lock the fan body against movement when the gearing is disconnected from the motor shaft for non-oscillating operation of the fan.

8. In an oscillating electric fan, a pedestal, a fan body comprising an electric motor, a gear case and a housing for the motor and gear case, means pivotally mounting the fan body on the pedestal, gearing in the gear case for effecting oscillatory movement of the fan body thereon, a switch for the motor mounted on the gear case, an actuating member mounted on the gear case which projects through said housing to a position outside the housing where it is accessible for manual operation, and means connecting said operating member to both said gearing and said switch for connecting said gearing to the motor shaft and moving said switch from an open position to a closed position to effect oscillatory operation of the fan and for disconnecting said gearing from the motor shaft and moving said switch from an open position to a closed position for effecting non-oscillatory operation of said fan.

9. The combination defined by claim 8 wherein said gearing comprises a worm on the motor shaft, a worm wheel movable axially into and out of engagement with the worm, and a shaft for the worm wheel, and said actuating member comprises a disk having a cam thereon which engages the worm wheel shaft to effect the axial movement of the worm wheel and worm wheel shaft.

10. In an oscillatory electric fan having a fan body comprising an electric motor, a gear casing and gearing in the casing including a worm on the motor shaft, a worm wheel movable into and out of mesh with the worm for effecting oscillatory and non-oscillatory operation of the fan and a driven shaft on which the worm wheel is mounted, means for effecting movement of said worm wheel into and out of engagement with the worm comprising an actuating member rotatably mounted on the fan body, walls defining a groove in the driven shaft, and a cam integrally formed on the actuating member which rides in said groove.

11. The combination defined by claim 10 wherein a switch for the motor is mounted on the fan body and means connects the switch to said actuating member for moving it from an open position to a closed position when the actuating member is turned to connect the worm wheel to or to disconnect it from the worm.

12. The combination defined by claim 10 wherein means actuated by movement of the worm wheel out of mesh with the worm is provided for locking the fan body from oscillatory movement.

13. In an oscillating electric fan, an electric motor; a switch electrically connected to the motor, said switch having first, second and third operating positions, two of said positions being closed positions to cause energization of said motor and one of said positions being an open position; gear means including oscillating mechanism for oscillating said fan; plural position cam means operatively connected to said gear means for connecting or disconnecting said gear means to said motor to cause oscillation or to prevent oscillation of said fan; and manually moveable actuator means connected to the switch for disconnecting said gear means from said motor to prevent oscillation of said fan when the actuator moves the switch to one of said closed positions, and for moving said cam means to connect said gear means to said motor for oscillating the fan when the actuator moves the switch to the other one of said closed positions; said cam means including a cam surface integrally formed on the actuator for moving the gear means.

References Cited in the file of this patent

UNITED STATES PATENTS

| 1,327,129 | Wolff | Jan. 6, 1920 |
| 1,373,480 | Brainerd | Apr. 5, 1921 |
| 1,485,241 | Aronoff | Feb. 26, 1924 |
| 1,527,247 | Bouillon | Feb. 24, 1925 |
| 1,958,182 | Cote | May 8, 1934 |
| 1,971,373 | Gough | Aug. 28, 1934 |
| 2,055,225 | Tooker | Sept. 22, 1936 |
| 2,369,905 | Page | Feb. 20, 1945 |
| 2,503,146 | Anketell | Apr. 4, 1950 |
| 2,600,325 | Reisch | Jan. 10, 1952 |

FOREIGN PATENTS

| 467,379 | Italy | Dec. 5, 1951 |